United States Patent [19]

Perlman et al.

[11] Patent Number: 4,994,785
[45] Date of Patent: * Feb. 19, 1991

[54] HOOD ORNAMENT ALARM

[76] Inventors: Marvin K. Perlman, 6138 Caminito Pan, San Diego, Calif. 92120; Richard I. Perlman, 3852 Casta Bella Dr., La Mesa, Calif. 92041

[*] Notice: The portion of the term of this patent subsequent to Nov. 21, 2006 has been disclaimed.

[21] Appl. No.: 444,989

[22] Filed: Dec. 4, 1989

Related U.S. Application Data

[63] Continuation-in-part of Ser. No. 341,632, Apr. 21, 1989, Pat. No. 4,882,563.

[51] Int. Cl.$^5$ .............................................. B60Q 1/00
[52] U.S. Cl. .................................. 340/426; 307/10.2; 340/568
[58] Field of Search ............... 340/426, 429, 568, 571, 340/572, 668, 686, 687; 116/33; 362/80; 307/10.2; 180/287

[56] References Cited

U.S. PATENT DOCUMENTS

| | | | |
|---|---|---|---|
| 4,137,521 | 1/1979 | Martinez | 340/568 |
| 4,293,860 | 10/1981 | Iwata | 340/429 |
| 4,882,563 | 11/1989 | Perlman et al. | 340/426 |

*Primary Examiner*—Joseph A. Orsino
*Assistant Examiner*—Brent A. Swarthout
*Attorney, Agent, or Firm*—Ralph S. Branscomb

[57] ABSTRACT

A Mercedes Benz hood ornament structure is modified to include an alarm actuator switch connected to the vehicle horn. The spring-loaded restraint which holds the hood ornament element in its upright position is affixed with a sliding contact which rises into contact with a fixed contact when the hood ornament is deflected forwardly. The two contacts are wired into the horn circuit so that the horn is actuated when the ornament element is deflected forwardly, and the geometry of the mounting for the hood element is such that deflections rearwardly and sideways, such as might occur by accident or in a car wash, will not actuate the horn.

6 Claims, 2 Drawing Sheets

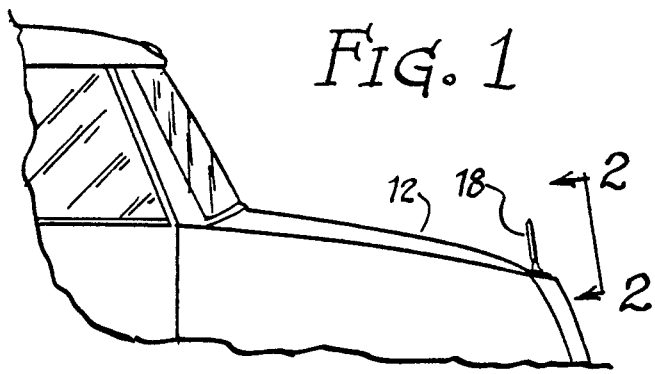
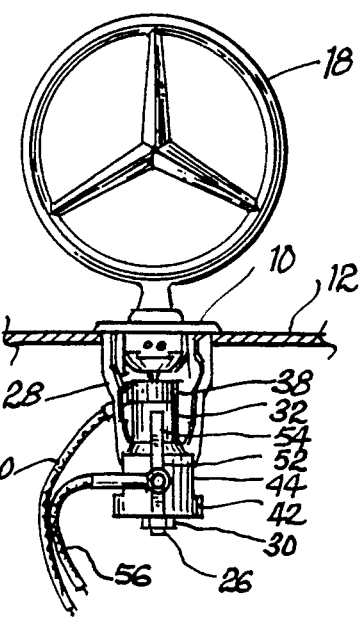
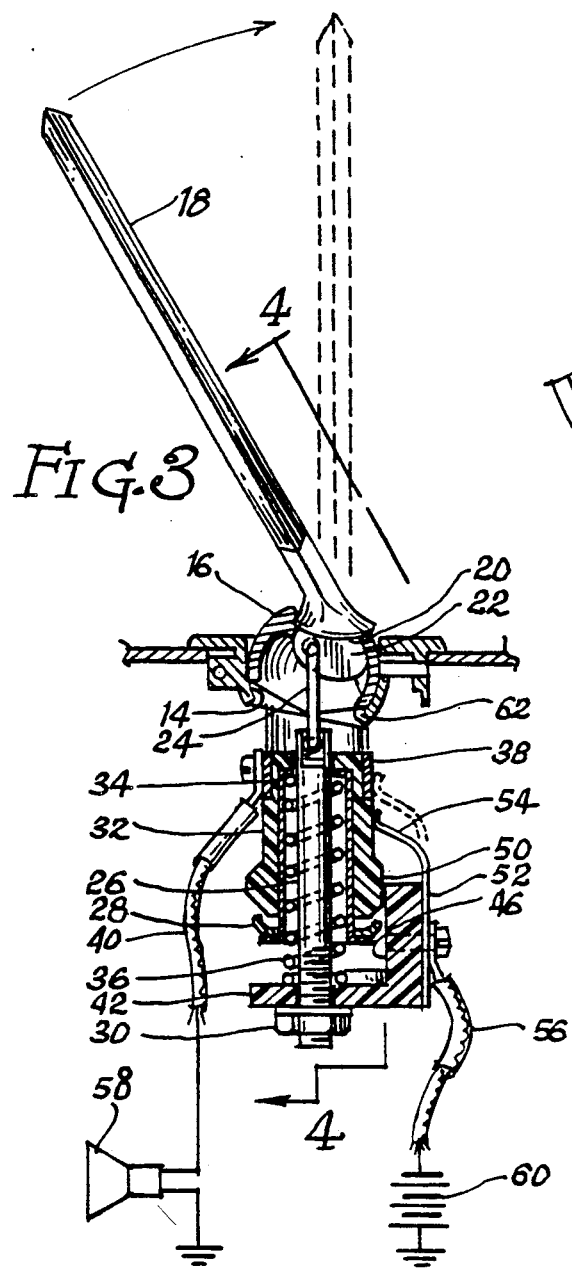
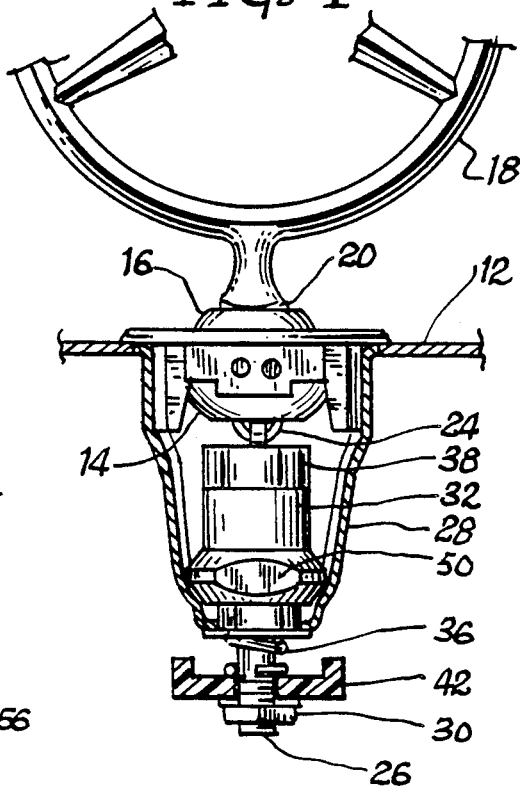

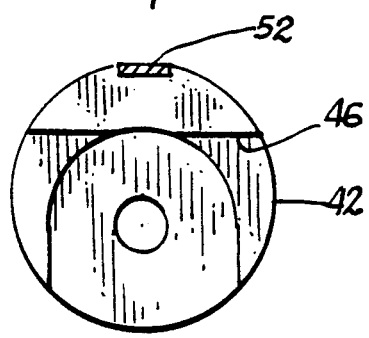
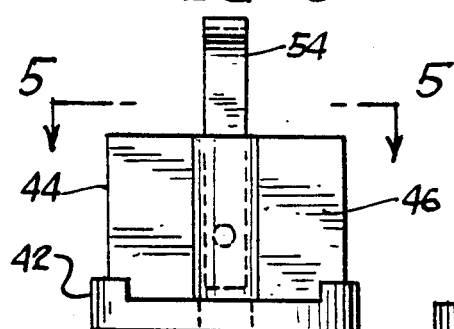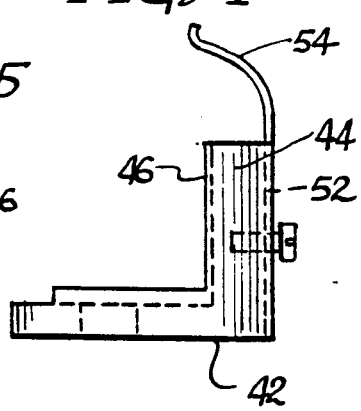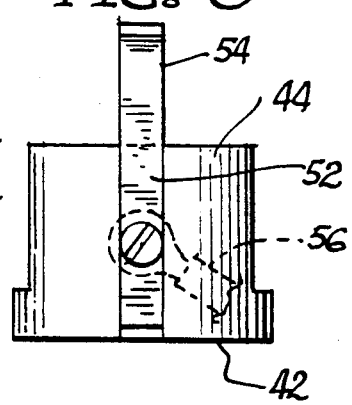
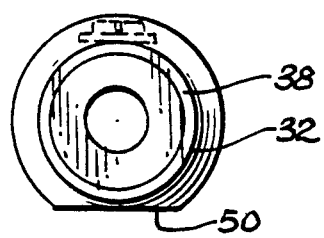
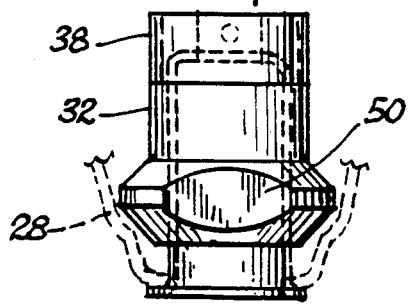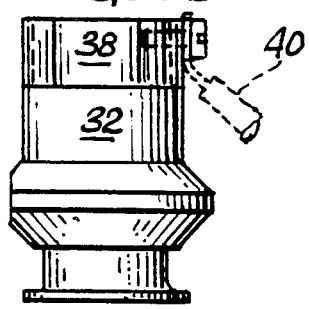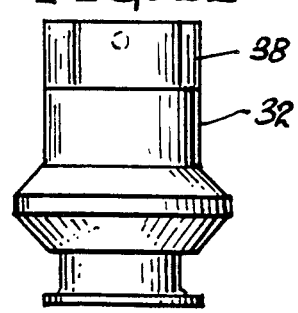

HOOD ORNAMENT ALARM

This application is a continuation-in-part of an application entitled Hood Ornament Theft Alarm, Ser. No. 07/341,632 filed April 21, 1988 and now U.S. Pat. No. 4,882,563. That application was directed toward an alarm arrangement for hood ornaments such as Cadillac ornaments. Whereas that invention, and the one disclosed herein both disclose improvements over the clumsy devices of the prior art used to prevent hood ornament theft, the alarm of the above-referenced case was not particularly well-adapted for installation on the Mercedes Benz models.

BACKGROUND OF THE INVENTION

Theft of hood ornaments has become quite popular among certain segments of our society. Although this is true of any hood ornament, it is especially true with Mercedes ornaments. Apparently, those individuals whose hobbies include collecting stolen hood ornaments, take special pride in Mercedes ornaments.

SUMMARY OF THE INVENTION

The alarm system disclosed herein carries forward the simplicity of design, compactness of its nature, and superiority in reliability and performance of the alarm in the above-referenced prior case. However, it differs from its predecessor in that it is adapted to replace a Mercedes Benz hood ornament structure, and, additionally, it utilizes a sliding sleeve electrical contact arrangement rather than the pivotal contacts disclosed in the prior device.

It also incorporates a directional discrimination feature made possible by the Mercedes ornament-mounting arrangement which allows the alarm to remain in its inactive state when the ornament is deflected rearwardly or to the sides, but when it is pulled forward, the horn will sound. This prevents false alarms from deflections of the ornament which are not deliberate, and depends on the fact that due to the inclination of the ornament element on the hood, a thief will always pull it forward in order to try to break it off of its mount.

BRIEF DESCRIPTION OF THE DRAWINGS

FIG. 1 illustrates the front end of a Mercedes with the ornament in place;

FIG. 2 is an elevation view taken along line 2—2 of FIG. 1 and also illustrating the alarm structure;

FIG. 3 is a longitudinal vertical sectional taken through the ornament and the hood;

FIG. 4 is a front elevation view of the ornament alarm with portions cut away;

FIG. 5 is a top plan view of the slide cutting through the contact finger, taken along line 5—5 of FIG. 6;

FIG. 6 is a front elevation view of the slide;

FIG. 7 is a side elevation view of the slide;

FIG. 8 is a rear elevation view of the slide;

FIG. 9 is a top elevation view of the sleeve;

FIG. 10 is a front elevation view of the sleeve;

FIG. 11 is a side elevation view of the sleeve; and

FIG. 12 is a rear elevation view of the sleeve.

DETAILED DESCRIPTION OF THE PREFERRED EMBODIMENT

The alarm is built into the structure of an existing Mercedes Benz hood ornament mount. The existing structure includes a mounting bracket having a hood mount element 10 which engages the sheet metal 12 of the hood. The exact nature of this structure is not pertinent to the invention. The hood mount element defines a socket 14 in which a spherical seat 16 rests. The spherical seat in turn seats the hood ornament element 18 which has a rim 20 toward the bottom, with a depending tongue 22 which extends through the upper portion of the seat 16. The tongue 22 engages a wire link 24 connected to a threaded shaft 26 which extends down through a hole in the yoke-shaped brace 28 where the shaft would normally terminate and be engaged by a nut 30.

A sleeve 32 rests in the brace 28 and defines a vertical bore through which the shaft 26 passes. The sleeve also converges around the bore at the top to define a spring seat 34 housing the spring 36 which applies expansive pressure between the sleeve and the nut 30 which has the result of holding the ornament upright.

As modified for the present invention, the sleeve mounts a contact ring 38 at its upper rim, with the rim being recessed so that its external surface defines a continuous surface with the cylindrical face of the sleeve. This fixed contact 38 has a connecting wire 40 screwed to it.

At the bottom of the hood ornament mount, just above the nut 30 is a slide 42 made of an insulating material The slide is apertured at the bottom and engaged on the shaft and has an upward extension 44 with a flat interior surface 46 which slides on flat 50 formed on the sleeve so that the sleeve and slide maintain their angular orientation as they are axially displaced relative to one another.

The slide mounts the sliding contact 52 which has a finger 54 arching over into contact with the sleeve 32. As shown in phantom in FIG. 3, as the slide moves up, the finger 54 slides along the surface of the sleeve, which is an insulator, and then into contact with the fixed contact. The sliding contact, like the fixed contact, has a connection wire 56, with both wires being connected into the horn circuitry as indicated by the horn element 58 and the battery symbol 60 which then passes to ground. It makes no difference which contact is connected into the horn side of the circuit and which to the battery or ground, as long as the horn is actuated when the contacts slide together.

The spherical seat 16 is, in general, free to rotate within the socket 14. However, the socket defines a small stop 62 which prevents the spherical seat from rotating forward in the socket, although it is free to rotate to the rear and to the sides. Because the point at which the link 24 attaches to the tongue of the ornament is more or less at the center of the projected sphere defined by the spherical seat, rotation of the sphere in its socket does not displace the shaft much. Therefore, deflecting the hood ornament rearwardly or to the side does not actuate the alarm.

However, when the ornament is deflected forwardly, the spherical seat is blocked from rotation by the stop 62 and the ornament element is fulcrumed out of its seat, raising the link and the shaft and bringing the sliding contacts into electrical contact. As mentioned above, this results in the alarm not being actuated when the vehicle passes through a car wash or is otherwise subject to the accidental deflection of the type which inspired the creation of resilient hood ornament mounts in the first place. The horn is also actuated when the ornament is lifted up.

The invention is simple and economical, as it constitutes a modification of an existing hood mount structure. Its sliding contact construction is virtually foolproof, and once it is mechanically installed, the electrical connections are the simplest possible, representing only two wires requiring connection into the horn circuit. Thus, the advantages of the invention of the parent case have been carried forward, and an improved contact arrangement has been added, along with modifications necessary for the special requirements of the Mercedes configuration.

We claim:

1. A vehicle hood ornament alarm for a vehicle hood ornament having an ornament element, a mounting bracket, a shaft connected to said ornament element, and extending down through said bracket, and bias means compressing said ornament element into said bracket and maintaining said ornament element in an upright position when not subject to a deflecting force and permitting said shaft to rise against said bias means when said ornament element is deflected, said alarm comprising:
    (a) a fixed electrical contact mounted in said bracket;
    (b) a sliding electrical contact mounted on said shaft below said fixed contact and insulated therefrom; and
    (c) wiring connecting to said fixed and sliding contacts for connection into the horn circuitry of said vehicle such that deflecting said hood ornament raises said shaft in said bracket, sliding said sliding contact into contact with said fixed contact, actuating the vehicle horn.

2. The structure according to claim 1 wherein said bracket comprises a hood mount, a rigid brace depending from said hood mount to define a yoke; and
    said fixed contact is mounted on a sleeve seated in said yoke and having a bore therethrough through which said shaft passes, and said hood mount defines an upwardly directed socket and includes a spherical seating element rotatable in said socket, said seating element defining a seat for said ornament element and said fixed contact comprises a ring mounted on said sleeve.

3. The structure according to claim 2 wherein said sleeve has an insulated body extending between said ring and said sliding contact, and said sliding contact has a contact finger that slides along the surface of said body and over said ring surface when said ornament is deflected.

4. The structure according to claim 3 wherein said sliding contact is mounted on an insulated slide engaged on said shaft below said brace.

5. The structure according to claim 4 wherein said sleeve has a flat on one side, and said slide has an extension defining a surface to ride on said flat to keep said sleeve and said slide aligned.

6. The structure according to claim 2 wherein said socket defines a stop on the lower portion of the portion thereof which is forward with respect to the vehicle in which said hood ornament is mounted, and said spherical element can rotate any direction but forward without raising said shaft, but forward rotation causes said spherical seating element to strike said stop and cease rotation, so that said ornament element is caused to rotate forward, raising said shaft, such that said contacts come into contact only when said ornament element is deflected forwardly in said spherical seating element.

* * * * *